United States Patent [19]
Bye et al.

[11] Patent Number: 5,824,358
[45] Date of Patent: Oct. 20, 1998

[54] FAT FREE EDIBLE COMPOSITION AND METHOD OF MAKING AND USING SAME

[75] Inventors: Douglas A. Bye, Salem, Oreg.; Joann Maxwell, Wadsworth, Ohio

[73] Assignee: The J. M. Smucker Company, Orrville, Ohio

[21] Appl. No.: 752,732

[22] Filed: Nov. 19, 1996

[51] Int. Cl.$^6$ .................... A23L 1/236; A23L 1/307
[52] U.S. Cl. .................... 426/658; 426/102; 426/103; 426/520; 426/654; 426/804
[58] Field of Search ................... 426/102, 103, 426/658, 654, 520, 804

[56] References Cited

U.S. PATENT DOCUMENTS

| | | |
|---|---|---|
| 4,466,983 | 8/1984 | Cifrese et al. ................ 426/103 |
| 4,774,095 | 9/1988 | Kleinschmidt et al. . | |
| 5,366,750 | 11/1994 | Morano . | |
| 5,409,719 | 4/1995 | Cain et al. ................. 426/103 |
| 5,571,547 | 11/1996 | Serpelloni et al. ........... 426/103 |

*Primary Examiner*—Helen Pratt
*Attorney, Agent, or Firm*—Vickers, Daniels & Young

[57] ABSTRACT

A substantially fat free, edible composition which is usable with a bakery product, such as a wafer, to provide a topping, icing or filling between two wafers, which composition is directed to the food technology that includes a substantially body of background such as physical properties and function of various constitutent components used in icings or fillings. The substantially fat free, edible composition includes essentially no added natural sugar and has the physical temperature characteristics of a generally hydrogenated fat. The composition is made up of sorbitol crystals partially dissolved by heat in water at a level of less than about 10% by weight of the composition and heated with the water for dissolution to a maximum temperature.

104 Claims, 5 Drawing Sheets

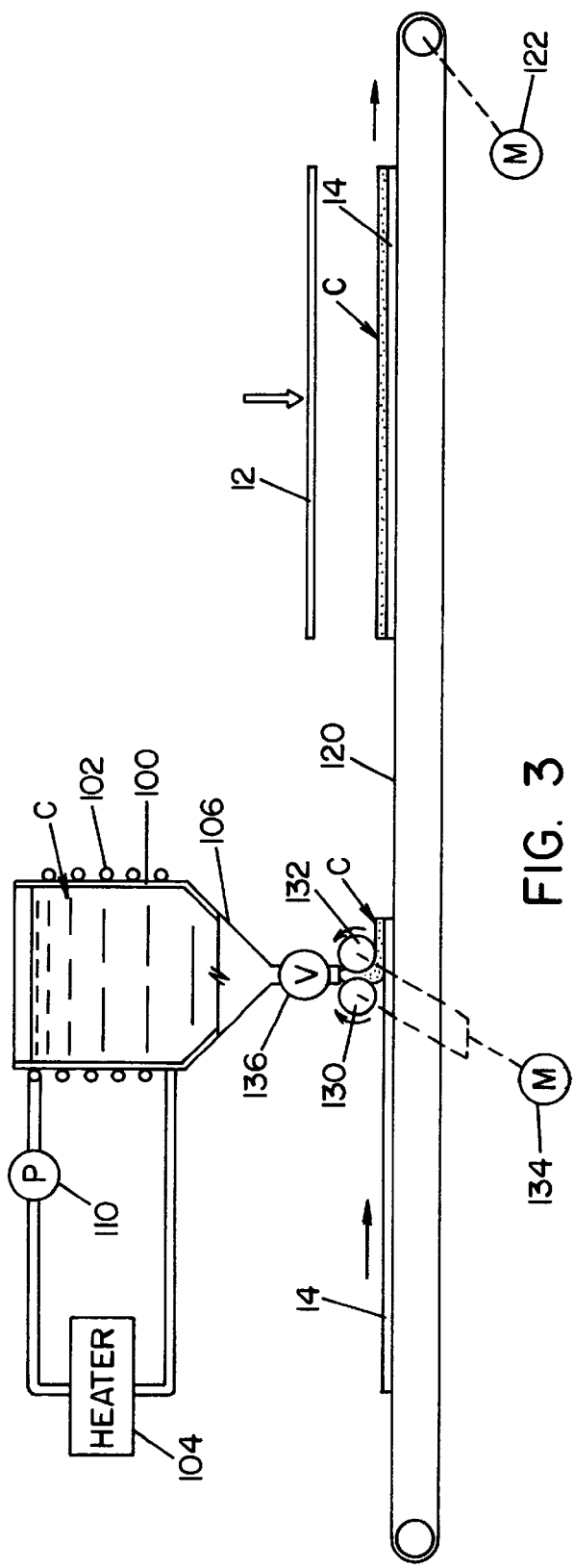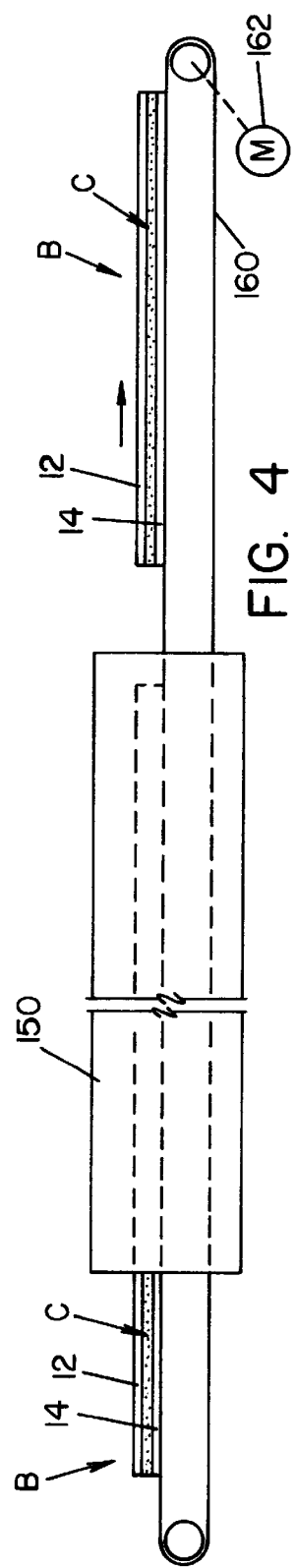

FAT FREE EDIBLE COMPOSITION AND METHOD OF MAKING AND USING SAME

The invention relates to a substantially fat free edible composition of the type used for icings on the top of or sandwiched between flat baked products, such as wafers, and to the method of making this fat free composition and for using this fat free composition in making food products.

INCORPORATION BY REFERENCE

The present invention relates to a composition which is usable with a bakery product, such as a wafer, to provide a topping, icing or filling between two wafers, which composition is directed to the food technology that includes a substantial body of background such as physical properties and function of various constituent components used in icings or fillings. So that such background technology need not be specifically described in this application, U.S. Pat. No. 4,774,095 and U.S. Pat. No. 5,366,750 are incorporated by reference herein. U.S. Pat. No. 4,774,095 discloses a filling for a bakery product which is an aqueous based composition that combines glycerin with a cellulose. The continuous phase of this filling is an aqueous sugar solution, with sugars selected to avoid crystallization that could result in undesirable texture. This known filling has a water activity below 0.50 and uses a network of ultra fine microfibrils, as a flow control agent to allow the filling to be baked with the food product. U.S. Pat. No. 5,366,750 is more relevant to the present invention since it is substantially free of fats and added natural sugars and utilizes ultra high surface area cellulose particles dispersed and reactivated in a hydrophilic liquid phase. This filler or icing is thermostable with a ultra-low water activity. Both of these patented compositions contain constituents and use technology employed in the present invention; however, the prior compositions are intended to provide a filling, icing or other added food product which is stable at high temperatures. The present invention would be rendered ineffective if heated to higher temperatures as will be explained. These prior patents are incorporated by reference for background information and as an explanation of the known technology relating to the preparation of spreadable food compositions and the properties of various constituents used in these compositions.

BACKGROUND OF INVENTION

The present invention is particularly applicable for use as the sandwiched, intermediate fruit based layer in a food product including two laminated, baked thin wafers and it will be described with particular reference thereto; however, it is appreciated that the composition produced in accordance with the present invention can be used for a variety of icings, toppings, creams and other thin layers of fruit based compositions or food component which composition or component are generally solid at room temperature and spreadable at elevated temperatures. The sandwiched wafer product now on the market has an intermediate layer which is generally formed from dispersing sugar in a melted fat, such as butter, with flavor constituents, such as fruit concentrate, chocolate, carmel or other food flavoring. The intermediate layer of the sandwich wafer food product is formed by heating the fat component, applying natural sugars and a selected food flavoring. This mixture has no substantial amount of water and is maintained heated at a temperature which allows it to be spread over one of the wafer layers. The other wafer layer is then applied over the top of the coated wafer to sandwich the composition between the layers. Then the sandwiched product is allowed to cool to room temperature, at which temperature the fat constituent of the layer between the wafers solidifies much like butter solidifies to have a consistency, texture and mouth feel allowing eating of the sandwiched wafer product to efficiently release the food flavoring. This product is extremely successful as a snack food and is sold in mass quantities at relatively low prices because the constituents of the product are relatively inexpensive. The wafers merely involve flour and water, with a possible color additive, that are baked in waffle irons. The filling layer or composition includes a fat and natural sugars with a minor amount of flavoring and, possibly, flavor enhancing constituents. The water activity of the filling layer is quite low, i.e. less than 0.60, so that the sandwich wafer product has a long shelf life. The filling does not moisten and change the eating characteristics of the wafers which remain crisp so they are very effective in handling of the product.

These wafer products, including a layer of fruit based food composition, are mass produced by manufacturers with special machinery; however, the product is high in fat content, which fat content is essential for the mouth feel characteristics of the product. Due to the recent preoccupation by consumers to ingestion of fat free or substantially fat free products, there is a substantial need to create a filling for such wafer sandwiched food products which has the taste and physical characteristics of the existing filling and can be produced with the existing equipment, but with substantially no fat and, as an alternative, with substantially no added natural sugars. Such a product does not now exist and is the subject of substantial research throughout the food industry, which research has not yet been completely successful to produce a product having the same organoleptic properties while being capable of manufacture by existing equipment at the same low cost of existing products.

THE INVENTION

The present invention relates to a substantially fat free edible composition having essentially no added natural sugar and having the physical characteristics of a generally hydrogenated fat to produce a filling, icing, topping or other layer having the organoleptic characteristics of a fat based composition and capable of being processed in existing equipment at costs competitive with existing icings. In accordance with the present invention, the novel composition uses sorbitol crystals as a starting solid product. Sorbitol is a relatively inexpensive polyhydric alcohol, i.e. "polyol," having a sweetness approximately 60% the sweetness of natural sugar. The calorie content of sorbitol is approximately 2.6 calories per gram and has a melting point of approximately 100° C. In the present invention, the product being produced is never heated above approximately 110°–120° F.; therefore, the melting point temperature of sorbitol is no factor in the present invention. The invention employs crystalline sorbitol such as those sold by SPI Polyols. Sorbitol has a relatively low rate of absorption in the gastrointestinal tract and is frequently used in dietetic foods; however, when using such product for icings and fillings, to which the present invention is directed, sorbitol concentration is in the neighborhood of about 2%. This allows the crystalline sorbitol to act as a sugar and be completely dissolved in the product during the mixing process. This is not the same as the use of sorbitol crystals in the present invention, wherein the crystalline sorbitol is only partially dissolved by heat in water at a level of less than 10% by weight of the total composition. The sorbitol crystals are mixed with a relatively small amount of water for the purposes of allowing a slight amount of crystal dissolution. This mixture of crystalline sorbitol and a small amount of water is heated so that the sorbitol crystals are further dissolved by heat; however, this heating procedure must not be above about 120° F. Indeed, in practicing the invention, the heating of the mixture of sorbitol crystals and a small amount of water is at a temperature of 80° F. to 110° F. for at least about 2.0–5.0 minutes. During this heating process at a low temperature only some of the sorbitol crystals are dissolved in the water. This process of heating the aqueous solution of sorbitol crystals in a small amount of water produces the composition that is used to create an icing, filling or topping which has the consistency and acts as a fat containing icing. After the heating process, it has been found that the composition reacts like hydrogenated fat in that it is spreadable at an elevated temperature of approximately 100° F. and becomes a relatively firm layer at room temperature, such as 70° F. This novel composition, in accordance with an aspect of the invention, can receive a food flavoring such as fruit concentrate, chocolate, carmel, peanuts butter, etc., which flavoring will impart to the composition a food characteristic. In accordance with an aspect of the invention, the water activity of the composition is controlled to be in the general range of 0.35–0.60. The composition has bulking agents, texture modifiers or filling materials to increase the solid content of the resulting composition to about 90% by weight. Consequently, the composition of the present invention has the organoleptic characteristics of a standard hydrogenated fat based filling or icing which is essentially fat free, has substantially no added natural sugars, has a water activity in the general range of 0.35–0.60 and a solids content of at least about 90% by weight of the composition.

In accordance with another aspect of the present invention, the basic inventive composition, formed by processing of crystalline sorbitol in a small amount of water, also includes the use of a polyol humectant, such as glycerin, in an amount approximately 10–25% of weight of the composition. The humectant characteristics of the glycerin or polyol further reduces the amount of water available for dissolving the sorbitol crystals during the heating process and reduces the water activity. This glycerin or other polyol humectant is a plasticizer so that the final product is more pliable. The polyol is a phase which can disperse the food flavoring constituents of the present invention and will capture a certain amount of the low level water in the composition. Another polyol, such as maltitol syrup, having 75% maltitol and 25% water, can be used as a plasticizer. The sorbitol crystals constitute about 25–50% by weight of the total composition.

In accordance with another aspect of the present invention, a substantially fat free edible composition having the physical temperature characteristics of a generally hydrogenated fat is formulated with 25–50% by weight sorbitol crystals, less than 10% by weight water, 10–25% of a non-crystallizing plasticizer, such as glycerin, and a food flavoring. This edible composition is formed by mixing the water, plasticizer and food flavoring into a liquid phase. Thereafter, the sorbitol crystals are mixed into the liquid phase and heated to partially dissolve the crystals into the liquid phase. Thereafter, the product is cooled thereby causing the sorbitol crystals to reform with the originally undissolved sorbitol crystals. The undissolved sorbitol crystals act as seed crystals to orient the new crystals produced by cooling the heated mixture. Consequently, a firm product is created upon cooling.

In accordance with still a further aspect of the present invention a laminated wafer product is provided. This wafer product has a layer of a hardened, edible fruit based composition between two baked wafers. The fruit based composition is generally fat free, with essentially no added natural sugar, and has the general physical temperature characteristics of a hydrogenated fat. This composition comprises sorbitol crystals partially dissolved by heat in a low level of water to give a water activity of less than about 0.60 and into which fruit flavoring is added.

In accordance with another aspect of the present invention the edible composition of the laminated wafer product has a solid content of at least about 90%.

In accordance with a further aspect, the composition contains a plasticizer that is non-crystallized at room temperature. This plasticizer is in the range of about 10–25% by weight of the edible composition.

Still a further aspect of the invention is the provision of a method of making a fat free edible crystalline composition having the physical temperature characteristics of being generally solid at 70° F. and generally spreadable at 110° F. This method comprises the steps of forming an aqueous solution of water and crystalline sorbitol with at least five times the weight of sorbitol compound to the water, adding a food flavoring ingredient to this aqueous solution, heating the aqueous solution to the temperature in the range of 80° F. to 110° F. and then cooling the solution to less than 70° F. The method can be extended into the concept of holding the solution at a temperature in the range of 100° F. to 110° F., applying the heated solution to a food product and then cooling the food product to a temperature substantially less than 70° F.

The primary object of the present invention is the provision of a edible composition of the type used for fruit based icings, fillings, etc., which composition has substantially no fat and can replace the prior art composition involving dispersing sugar and fruit flavoring in melted fat, such as butter or margarine.

Another object of the present invention is the provision of a composition, as defined above, which composition has no, or essentially no, added natural sugar, can be processed with existing equipment and is relatively inexpensive.

Still a further object of the present invention is the provision of a method of manufacturing the composition, as defined above, which method involves the use of sorbitol crystals in a relatively low amount of water. This mixture is heated to convert the mixture into a composition reacting similar to hydrogenated fat, such as butter.

Still a further object of the present invention is the provision of a composition made in accordance with the method explained above, which composition is used in the production of a snack food of the type including a baked layer with the composition spread or deposited thereon.

Yet another object of the present invention is the provision of a composition produced in accordance with the method defined above, which composition has a controlled hardened condition determined by the temperature to which the mixture forming the composition is initially heated and also to the extent that non-crystalline plasticizers and/or bulking agents are employed.

These and other objects and advantages will become apparent from the following description of the invention.

BRIEF DESCRIPTION OF DRAWINGS

FIG. 3 is a side elevational view showing, schematically, existing equipment for applying a layer made in accordance with the present invention to form the snack food product illustrated in FIG. 1;

FIG. 4 is a side elevational view showing, schematically, a cooling tunnel, in cut away, to cool the snack food assembled with the equipment shown in FIG. 3;

PREFERRED EMBODIMENT

Figure 1:
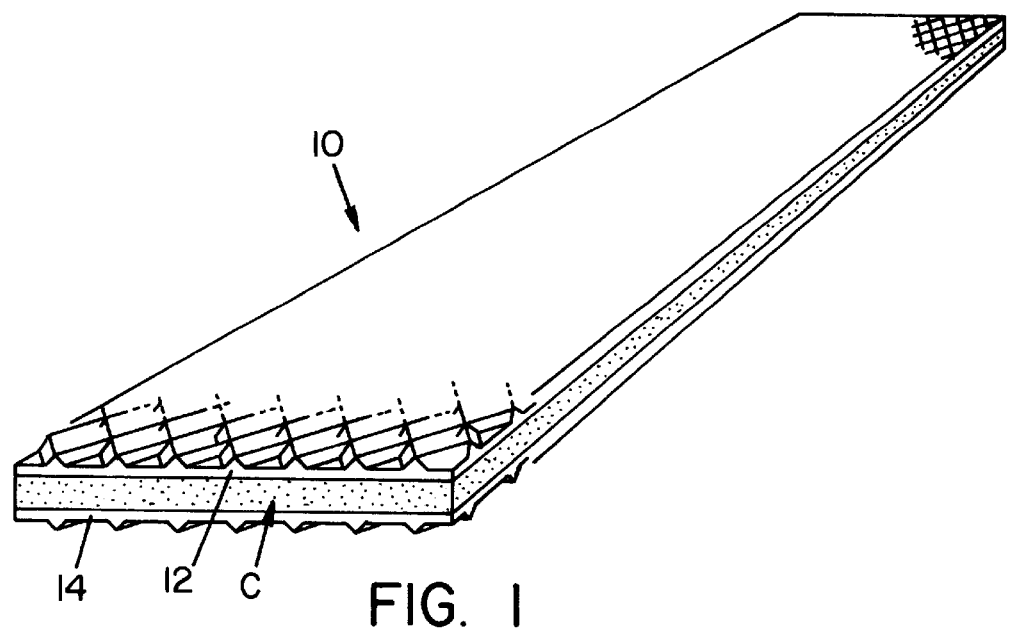
FIG. 1 is a pictorial view of a sandwiched snack food manufactured in accordance with an aspect of the invention and including two wafers separated by an icing, filling or layer formed by a composition constituting another aspect of the present invention.

Referring now to the drawings wherein the drawings are for the purpose of illustrating a preferred embodiment, FIG. 1 shows a wafer snack food 10 formed from two relatively thin baked wafers 12, 14 separated by a fruit flavored, fat free composition C constructed in accordance with the preferred embodiment of the present invention. This wafer snack food 10 is manufactured by first producing the flat thin wafers 12, 14 in a standard process utilizing a large waffle iron for baking an essentially flour and water confection into a relatively rigid, dry bakery product. These wafers are about 2 feet by 1½ feet in size. One of the large wafers is coated with composition C prior to being sandwiched between the second wafer. Thereafter, the sandwich product is cut by wires or other appropriate equipment into short, narrow strips being substantially 4–5 inches in length and slightly less than 1 inch in width. The overall thickness of snack food 10 is approximately ¼ inch, with composition C being slightly less than 1/16 inch. Such product is a standard commonly available snack food, except for the improvement made in composition C. The composition, in accordance with the present invention, has the components set forth in table I.

TABLE I

| INGREDIENT | PERCENTAGE (W.T.) |
|---|---|
| SORBITOL (CRYSTALS) | 25–50 |
| WATER | <10 |
| GLYCERIN (PLASTICIZER) | 10–25 |
| MALTITOL SYRUP | 0–35 |
| MALTODEXTRIN | 0–20 |
| RICE STARCH/OAT FLOUR | 0–5 |
| JUICE CONCENTRATE | 0–10 |
| FLAVORING | 0–3 |
| LECITHIN | 0–2 |
| MALIC ACID | 0–2 |
| ASPARTAME | 0–1 |
| ARTIFICIAL COLOR | 0–1 |

In an actual example of the present invention the composition C was formulated in accordance with the percentages of weight set forth in Table II.

TABLE II

| INGREDIENT | PERCENTAGE (W.T.) |
|---|---|
| SORBITOL (CRYSTALS) | 40.6 |
| WATER | 3.0 |
| GLYCERIN | 20.0 |
| MALTITOL SYRUP | 16.4 |
| MALTODEXTRIN | 11.0 |
| RICE STARCH/OAT FLOUR | 3.0 |
| STRAWBERRY JUICE CONCENTRATE | 2.0 |
| FLAVOR | 1.5 |
| LECITHIN | 1.2 |

The basic components of composition C is sorbitol crystals, a small amount of water and a plasticizer and humectant preferably in the form of glycerin. The function and characteristics of glycerin, a small amount of water and the plasticizer will be explained in detail since this system is the essence of the present invention. Maltitol syrup is a solution of 75% maltitol, which is a polyol, with 25% water. This syrup is a polyol and acts as a plasticizer; however, one of its basic functions is to add solids to composition C. In accordance with an aspect of the invention composition C has at least about 90% solids. Since maltitol is a polyol formed from maltose it does add some sweetness; however, it will not crystallize at temperatures involved in use of the composition C. Thus, maltitol syrup is a non-crystallized solid, somewhat like the polyol glycerin, but with a lesser humectant characteristic. This syrup modifies the texture and could be replaced by other polyols.

Maltodextrin is a relatively inexpensive bulking agent used to increase the solids content of composition C. It will not crystallize at room temperature and is a source of solids; however, it is not a source of solids like glycerin and maltitol, since it is not a polyol. Consequently, maltodextrin is employed for adjusting the final texture of composition C to add stiffness and reduce the stringiness of the composition. This material builds body into the composition C. Since this material is a solids additive to composition C, it is possible that a pre-gelatinized starch could be used as replacement for maltodextrin.

A slight amount of rice starch and oat flour is used as a fat mimetic to improve the mouth feel of composition C. This material is a fat replacement and functions as such because of its small granular size; however, it is used to modify the general physical attributes of the resulting composition C. This material is not essential to the invention.

An appropriate food flavor constituent is added to composition C. In practice, the food flavor constituent is a fruit juice concentrate, such as strawberry fruit juice concentrate. Of course, chocolate, carmel, peanut butter and other food constituents could be added to composition C to control the flavor of the composition, since the basic inventive system utilizing sorbitol crystals, a low amount of water and glycerin has no recognizable food flavor. Of course, the food constituent could be enhanced by additional flavoring constituents. When fruit is employed as a food component or constituent, malic acid or other citric or food acids could be employed with a juice or fruit puree to increase the tartness, which is normally associated with enhanced fruit flavors. Consequently, this acid is an option to add to the fruit flavor when the food constituent of composition C is a fruit concentrate and/or puree.

In accordance with an aspect of the present invention, a slight amount of lecithin is employed in composition C. The lecithin is in liquid form and is used to modify physical characteristics of composition C. Lecithin includes about 50% fat; therefore, composition C when using lecithin has a slight amount of fat, but is still referred to as essentially fat free. In the preferred example of the present invention, lecithin includes 1.2% by weight; therefore, the fat content of composition C in the illustrated example would be approximately 0.6% of the composition. Thus, the composition is essentially fat free and fat is only introduced as a part of liquid lecithin used as a parting agent to prevent stickiness. This modification keeps the wafer food 10 shown in FIG. 1 parted when it is cut longitudinally. Composition C tends to reform and join the cut pieces together without lecithin. As is known, lecithin is an emulsifier having the capability of seeking out and combining with both water and fat. Since there is no fat in composition C, lecithin primarily attempts to combine molecularly with water to improve the cutability and mouth feel of a food product employing a layer of composition C.

Figure 2:
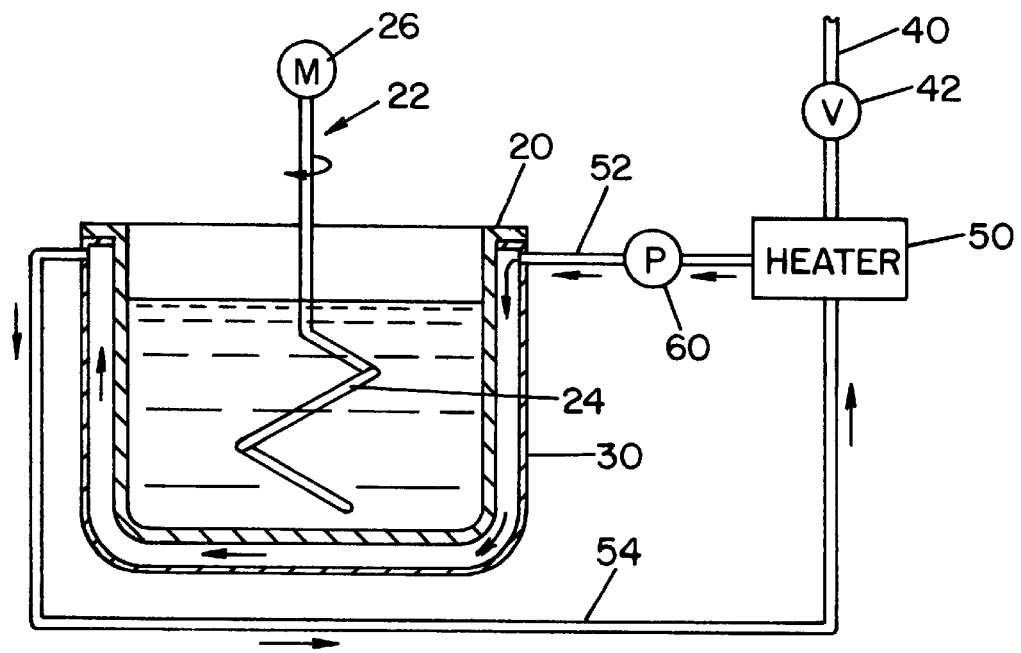
FIG. 2 is a side elevational view, illustrating schematically, the mixing and heating steps used in practicing an aspect of the present invention.

Referring now to FIGS. 2–4, the example using the overall ingredients of the invention described in Table II is processed to produce composition C. The composition C is then used in a wafered sandwich product as shown in FIG. 1. The liquid components of composition C are first mixed in kettle 20 with a blender 22 having a paddle 24 and a motor 26, much like a dough kneading blender.

The liquid phase includes water, glycerin, maltitol syrup as the primary liquid ingredients. Also added would be liquid lecithin, which has no water, fruit juice concentrate having a slight amount of water and the flavoring and/or coloring compounds. In a separate container the dry ingredients are mixed. The dry ingredients include at least sorbitol. To produce texture and organoleptic characteristics, the dry ingredients of the preferred embodiment also include maltodextrin, rice starch, as a fat mimic, and malic acid. These dry constituents form the solid phase of the composition C. Glycerin and maltitol are polyols and do not include water. Indeed, they are humectants to draw water from the liquid phase to allow less water available for dissolving the solids, the primary one of which is crystalline sorbitol. After the liquid phase has been created in kettle 20, the solid material is then poured into the kettle while the mixture is being agitated by blender 22. After being thoroughly mixed, composition C is heated to a temperature of 80°–110° F. and is maintained always below about 120° F. To heat composition C in kettle 20 the kettle is provided with a standard hot water or steam jacket 30. In practice, water is employed for heating kettle 20 through use of jacket 30. Filtered water enters through inlet 40 and valve 42 into heater 50 which heats the water to the desired temperature in the range of 80°–110° F. This water is circulated through inlet line 52 and returned by line 54 under the action of pump 60. After the mixture has been heated to the desired temperature, it has the consistency of a pourable melted hydrogenated fat such as butter. In making snack food 10, composition C is held at the elevated pourable and spreadable temperature. This temperature is generally in the range of 100°–105° F. The heated mixture is placed in hopper 100 heated by coils 102 by a water heater 104. To maintain composition C at the desired high, spreadable and applicable temperature, heated water is circulated through coils 102 by an appropriate pump 110. A conveyor 120 below hopper 100 is driven by motor 122 to carry one of the large wafers 14 which has been produced by a waffle iron and is fairly large in size, which is about 2 feet×1.5 feet in dimension. At the bottom of chute 106 of hopper 100 are a pair of transversely extending dispensing or feed rolls 130, 132 driven by motor 134. As conveyor 120 moves wafer 14 below dispensing rolls 130, 132 valve 136 allows a thin layer of approximately 1/16 inch of composition C to be deposited onto the top of wafer 14. Thereafter, a magazine of additional wafers discharges wafer 12 to the top of wafer 14 to form a large sandwiched food product B. Thereafter, large food product B is moved to an elongated cooling tunnel 150 by conveyor 160 driven by motor 162 as shown schematically in FIG. 4. This step reduces the temperature of the composite food product B to approximately 40° F. Thereafter, the product is cut by wires or other slitting mechanisms to produce long strips of the type customarily seen in retail outlets shown as snack food 10 in FIG. 1. A critical aspect of the invention is that the composition C is never heated to an elevated temperature which overheating has been found, in the preferred embodiment to be approximately 120° F. When overheated, the composition will not solidify and the fluid condition of the composition is essentially non-reversible. The present invention recognized the fact that the composition can be heated to an elevated temperature, but to a temperature below a maximum temperature to create the novel composition C. The invention produces an icing that has the characteristics of a fat and sugar icing or coating in that it is spreadable at elevated temperatures, such as approximately 100° F., but generally solid or firm at room temperature, such as about 70°–80° F. The resulting composition manufactured in accordance with the present invention can transition between a low temperature and a high temperature of approximately 110° F. The change in temperature causes the composition C to change in viscosity. This is a unique characteristic for a fat free composition. Composition C acts as a standard fat plus sugar icing; however, tests have illustrated that if composition C is heated to higher temperatures, such as 150° F., it becomes clear and remains liquid. It can no longer cycle between a solid heavy crystalline structure and a generally spreadable low crystalline structure.

Figure 5:
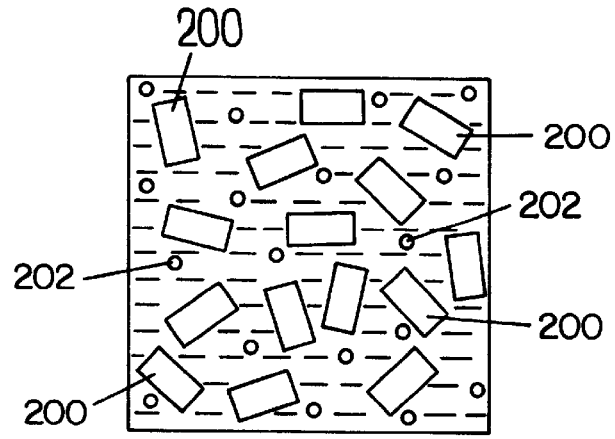
FIG. 5 is an enlarged diagrammatic view showing schematically the mixture constituting the basic aspect of the present invention.
Figure 6A:
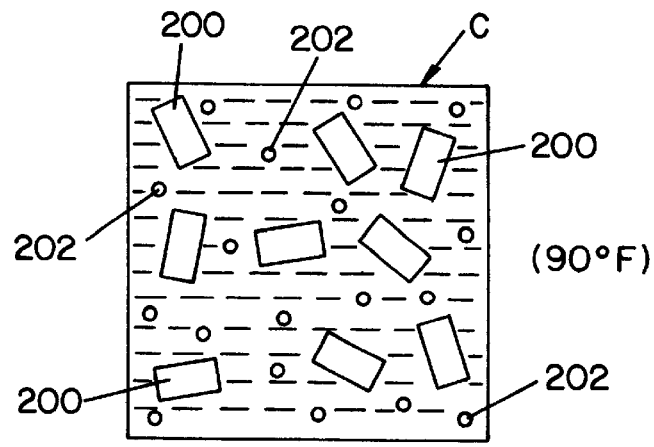
FIG. 6A is a diagrammatic view similar to FIG. 5 wherein the mixture of the present invention is heated to 90° F.
Figure 6B:
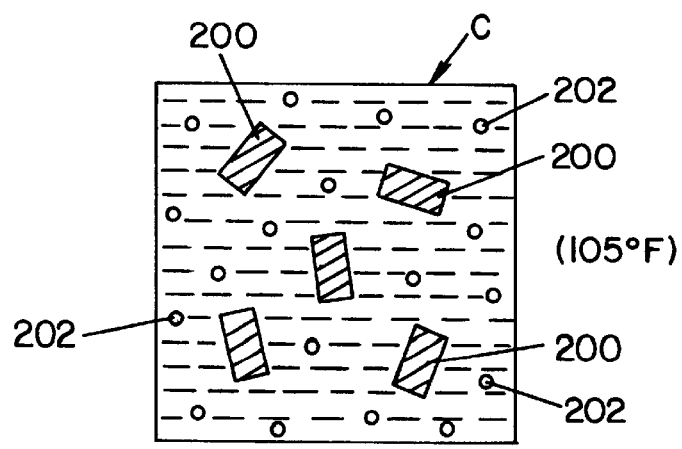
FIG. 6B is a view similar to FIG. 6A wherein the mixture is heated to 105° F.
Figure 7:
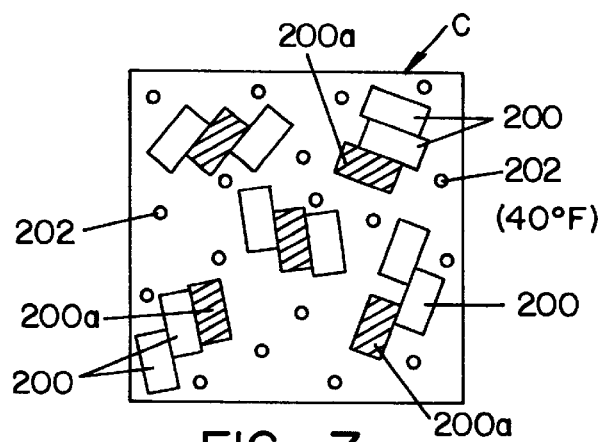
FIG. 7 is a diagrammatic view of the mixture shown in FIG. 6B cooled to 40° F. and forming the layer used between the wafers of the food product shown in FIG. 1.
Figure 8:
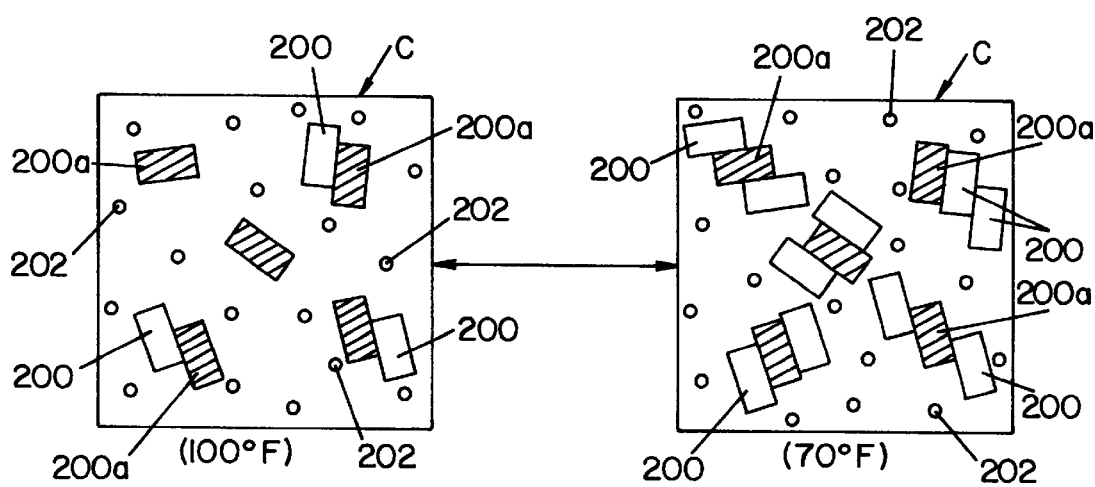
FIG. 8 is a two view diagram showing the heat response of the composition shown in FIG. 7 illustrating the reversible heating characteristics of a composition formulated in accordance with the present invention.

The present invention pertains to the formation of composition C, which is fat free but acts as a fat based icing in physical characteristics and organoleptically. It has been found that if the composition C is heated to a temperature below 105° F. in the heating step of the present invention, the resulting composition C at lower room temperatures is generally solid. The higher the temperature of the heating step in formation of composition C, the more firm the composition C will be at lower room temperatures. The crystalline theory is not necessarily fully understood; however, it is believed that the crystalline dynamics are the diagrammatic views 5–8. In FIG. 5, sorbitol crystals 200 are dispensed in a low amount of water with food constituents, illustrated as the dots 202. With a low amount of water in the mixture before formation of composition C, there is a minor number of crystals actually dissolved in the water. At room temperature the sorbitol crystals are mixed with a slight or minor amount of water. The large number of sorbitol crystals remain in crystalline form, as illustrated in FIG. 5. This starting mixture of water and sorbitol crystals is then heated, in accordance with the invention, to an elevated temperature in the range of at least 80° F. to about 110° F., but no more than 120° F. If the starting mixture shown in FIG. 5 is heated to a temperature of 90° F., the sorbitol crystals 200 are reduced in number. As the mixture increases in temperature the crystals are more soluble in the limited amount of water. FIG. 6A illustrates a diminution of the number of crystals to a finite number such as 9 crystals, a number which is only representative and illustrative. Should the mixture of limited water and sorbitol crystals 200 be increased to an elevated temperature, shown in FIG. 6B as approximately 105° F., the number of undissolved sorbitol crystals 200 is reduced to a representative or illustrative number of 5. As can be seen between FIG. 6A and FIG. 6B, as the temperature of the starting mixture increases in the heating step of the method used in the preparation of composition C, a fewer number of free sorbitol crystals remain undissolved in the limited amount of water. The crystals in FIG. 6A and FIG. 6B form "seeds". By the heating step, the starting mixture shown in FIG. 5 is converted to the inventive composition C, shown in FIG. 6A and in FIG. 6B. This heating step is necessary to form composition C. If the starting mixture of FIG. 5 were maintained, it would have no firming action and would remain a mixture of liquid and solid without the characteristic of being changed in consistency as the temperature increases or decreases. With composition C heated to the temperature illustrated in FIG. 6B, five seed crystals 200 are illustrated for explanation purposes. Referring now to FIG. 7, when composition C heated to 105° F. in the heating step is cooled to 40° F., crystals 200 reform or recrystallize from their dissolved condition. The new sorbitol crystals then are attracted and form a structured lattice work based upon the existence of seed crystals, which were not dissolved during the heating step. This concept is illustrated in FIG. 7, wherein the seed crystals are number 200a. Reformed crystals 200 are formed on the seed crystals into a structured lattice work. In this manner, composition C has a firmness as it is cooled and has a pourability as it is heated. This heat, or temperature, characteristic is illustrated by the two transition views in FIG. 8 wherein composition C is shown in its solid form to the right at 70° F. with a substantial amount of crystals 200 in the limited amount of water and in the left where composition C is pourable or spreadable with only a few of crystals 200 having been reformed. The limited amount of water has a higher amount of solubility for the sorbitol crystals at 100° F. As the increased bulk factor of the crystals increase, the composition C becomes more firm. As the bulk factor decreases, as shown in the left of FIG. 8, composition C becomes spreadable and malleable and generally thixotropic. In all of these examples, the starting mixture of FIG. 5 must first be subjected to a heating step, which step is at a temperature between 80° F. and 110° F. Referring again to FIG. 6A, if the temperature of the heating step is relatively low, the large number of crystals 200 remain undissolved. This allows a fewer number of crystals to be reformed or recrystallized for the purpose of subsequently rigidifiing composition C.

Figure 9:
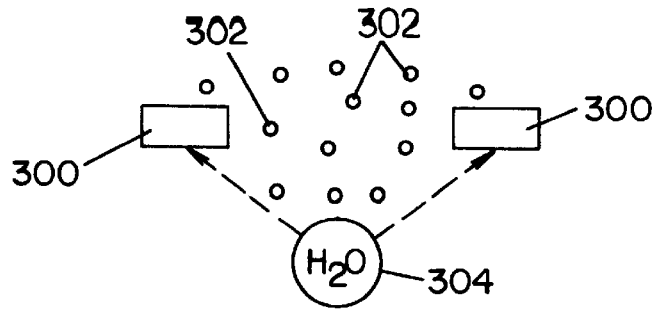
FIG. 9 is a schematic diagram showing two spaced sorbitol crystals to illustrate the reaction of the crystals with the low amount of water in a composition formulated in accordance with the present invention.
Figure 10:
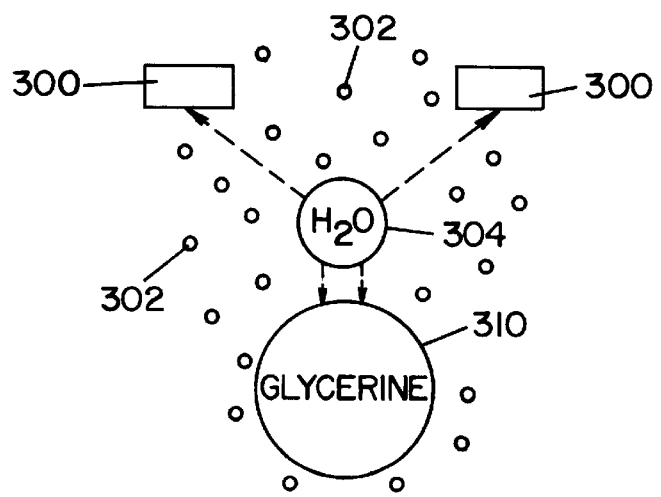
FIG. 10 is a view similar to FIG. 9 wherein the novel composition includes a glycerin plasticizer and humectant; and, FIG. 11 is a schematic view of the edible composition of the present invention illustrating the existence of the glycerin plasticizer and humectant.
Figure 11:
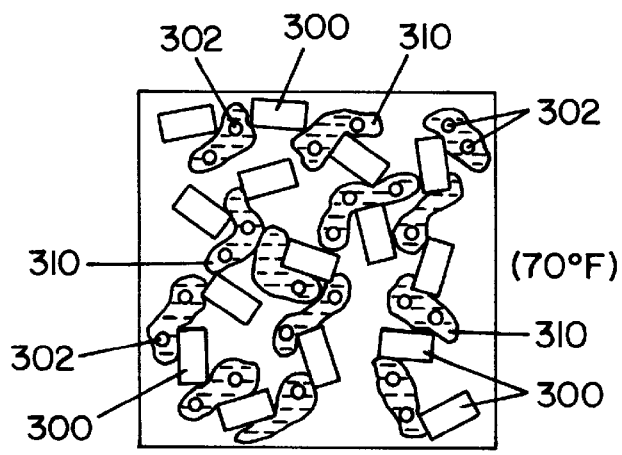

In FIGS. 9–10 the function of the polyol humectant in the form of glycerin is schematically illustrated. Sorbitol crystals 300 and food constituents 302 are combined with a small amount of water 304 in the starting mixture of FIG. 5 preparatory to the heating or curing step of the present invention. As indicated by the dashed lines, the small amount of water 304 is available for the purposes of dissolving a limited number of crystals 300. In the preferred embodiment, 3% water is used as shown in Table II. Thus, the water activity of the resultant composition C after the heating approaches the upper limit of 0.60. To limit the water activity, glycerin 310 is added to the starting mixture of FIG. 5 preparatory to the heating or curing step. Such adjustment of the mixture shown in FIG. 5, is illustrated in FIG. 10, wherein glycerin 310 aggressively attracts water to reduce the water activity and the amount of water available to dissolve crystals 300. In this manner, the water activity is reduced. In addition, the glycerin is a plasticizer as schematically illustrated in FIG. 11. The present invention anticipates the use of glycerin as both a plasticizer and a humectant to reduce the water activity. However, the process described with respect to FIGS. 5–8 could be accomplished without the use of a plasticizer. The plasticizer modifies the texture of the solidified crystalline structure as represented by the right hand view of FIG. 8. The amount of plasticizer or glycerin 310 is determined by the desired final consistency of the solidified composition C and the desired final water activity of the composition. As the glycerin content increases, the water activity is decreased. Also, the deformability at room temperature of solidified composition C is modified.

Composition C is a substantially fat free icing or filling which has the characteristics of a hydrogenated fat, such as butter, which is spreadable or flowable at higher temperatures below 110° F. and relatively firm at room temperature. The adjustment plasticizers, bulking agents, flavor, water activity, and solids content can be modified so long as the system employs sorbitol crystals in a low amount of water with a mild heating step to partially dissolve the sorbitol crystals while leaving a finite number of crystals available for crystalline formation upon reducing the temperature of composition C.

If there is a desire to increase the sweetness of composition C, aspartame in small amounts can be added. Such addition of artificial sweeteners is not preferred and is used only for sweetness adjustment. Composition C is a high solids, low water activity, water based icing, filling with no added fat or natural sugars, which novel composition functions in much the same way as a fat based product utilizing fat and sugar. The "set" properties produced in composition C is by a mechanism other than colloids as used in the prior art. It has been found that composition C, when using a fruit concentrate for flavoring, has good eating qualities, is not sticky or tacky even though the total solids are at least about 90%. By this formulation, the water activity of composition C can be retained between 0.35 and 0.60. Composition C is easy to pump, deposit and spread at 100° F. It contains a short texture; however, if the composition is heated above 120° F. the composition will not set upon cooling. The resulting room temperature texture of composition C can be modified between firm to soft by the addition of the plasticizers, such as polyols in the form of glycerin and maltitol syrup, and/or liquid lecithin. The novel process involves mixing the liquid ingredients together in a vessel, blending the dry ingredients and then adding the dry ingredients to the liquid phase while stirring the mixture until the mixture is smooth. Thereafter, the critical step is to heat the mixture to a temperature generally in the range of 80°–110° F., but it is preferably generally to 100° F. The water in the formula is sufficiently limited in quality and availability. There is competition between the polyols; therefore, the sorbitol is not completely dissolved. Upon cooling the partially dissolved or undissolved sorbitol orients itself in such a way to form a matrix with a high bulk factor of sorbitol crystals that renders the product firm, but not flowable. It has been found that the use of conventional mono or disaccharides and polydextrose over approximately 10% reduces or eliminates the setting properties of the composition C. The composition contains at least about 25–30% crystalline sorbitol and at least about 90% total solid content. Crystalline sorbitol must be used. Composition C can be remelted and reset as shown in FIG. 8 provided it is not to a temperature exceeding approximately 110° F.

Composition C duplicates the heat characteristics of a fat based icing and is spreadable at elevated temperatures. Sorbitol is a sugar molecule with an alcohol group, not a hydrocarbon. Composition C replaces the prior icing, wherein sugar and flavoring is dispersed in a melted fat and then applied and solidified. Composition C is generally applied at about 100° F. It is preferred that the heating step be accomplished at at least about 100° F. to produce the preferred room temperature firmness for composition C. The sorbitol crystals are temperature sensitive and the amount of recrystallization as the solution cools is controlled by the number of seed crystals remaining undissolved during the heating step. As the temperature increases, more sorbitol crystals are dissolved in the limited amount of water. After composition C has been manufactured, it can be reheated to 100° F. and applied without changing the room temperature characteristics of the composition. The sorbitol crystals are used for firmness instead of fat, such as butter or hydrogenated vegetable oil. Food flavoring in the form of powder, puree or concentrate gives distinctiveness to the icing. It is novel to use sorbitol, which has heretofore been merely a sugar substitute. Composition C involves a small amount of water so that the crystals of the sorbitol can not be dissolved completely during the heating step as long as the heating process is performed below about 120° F. The heating step drives a controlled amount of sorbitol into the solution with the minimum amount of water, with the final firmness of the product or room temperature being determined by the temperature of the heating step. If the heating step is performed between 80°–90° F., the resulting room temperature composition will be less firm than if the starting mixture of FIG. 5 were to be heated to approximately 110° F. It has been found that without the plasticizer, the use of a heating step of approximately 105° F. will result in a rigid composition C at room temperature. This causes a brittleness of composition C when it is applied in thin layers. Such brittleness will dissolve when eaten, such like a hard glaze. The amount of plasticizer or glycerin 310 is determined by the desired final consistency of the solidified composition C and the desired water activities.

Manufacturers do not need to change their equipment to use composition C as a replacement for a standard fat based icing or filling.

As the crystals of sorbitol come out of solution during the cooling step, they orient themselves based upon the existing C crystals remaining undissolved. As the number of C crystals increase and the number of solution crystals decrease, the resulting icing is reduced in firmness.

In practice, the cooling to 40° is accomplished in approximately 15–20 minute period. The time of cooling is not important. Shipment of this product should be in containers which do not have an ambient temperature exceeding about 100°–110° F. Heating of the mixture shown in FIG. 5 to an elevated temperature is an irreversible process. After composition C has been formed, than the heating and cooling of composition C is a reversible heat process with firmness being in a direct function of the temperature.

Having thus defined the invention, the following is claimed:

1. A method of making a fat free edible crystalline composition having the physical temperature characteristics of being generally solid at 70° F. and generally spreadable at 110° F., said method comprises the steps of:
    a) forming an aqueous solution of water and crystalline sorbitol with at least five times the weight of sorbitol compared to said water;
    b) including a food flavor ingredient in said aqueous solution;
    c) heating said solution to a temperature in the range of 80° F. to 110° F.; and,
    d) cooling said solution to less than 70° F.

2. A method as defined in claim 1, including the additional steps of:
    e) holding said solution at a temperature in the range of 100° F. to 110° F.;
    f) applying said heated solution to a food product; and,
    g) cooling said food product to a temperature substantially less than 70° F.

3. A method of making a food product comprising a baked substrate with an essentially fat free layer having the temperature characteristics of a hydrogenated fat, said method comprising the steps of:
    a) forming a mixture of crystalline sorbitol in the range of 25–50% by weight, less than 10% by weight water and a plasticizer;
    b) heating said mixture to a temperature in the range of 80° F. to 110° F., but no higher;
    c) applying said heated mixture as a layer onto said substrate; and,
    d) cooling said substrate and layer.

4. A method as defined in claim 3, wherein said plasticizer is a polyol.

5. A method as defined in claim 3, wherein said plasticizer is glycerin.

6. A method as defined in claim 3, wherein said plasticizer is 10–25% by weight of said mixture.

7. A method as defined in claim 6, wherein said plasticizer is glycerin.

8. A method as defined in claim 3, wherein said mixture has a water activity in the range of 0.35 to 0.60.

9. A method as defined in claim 8, wherein said mixture has a solids content of at least about 90%.

10. A method as defined in claim 3, wherein said mixture has a solids content of at least about 90%.

11. A method as defined in claim 3, wherein said mixture includes a bulking agent and has a solids content of at least about 90%.

12. A method as defined in claim 3, wherein said mixture has a food flavoring component.

13. A method as defined in claim 12, wherein said food flavoring component is fruit based.

14. A method as defined in claim 13, wherein said mixture includes a food acid, said food acid includes an acid selected from the group consisting of malic acid, citric acid and mixtures thereof.

15. A method as defined in claim 12, wherein said food flavoring component is selected from the group consisting of fruit, chocolate, carmel, peanut butter and mixtures thereof.

16. A method as defined in claim 3, wherein said mixture being heated for up to about five minutes.

17. A method as defined in claim 3, including the additional step of only partially dissolving said crystalline sorbitol in said water.

18. A method as defined in claim 3, wherein said plasticizer includes maltitol.

19. A method as defined in claim 3, wherein said mixture includes a fat mimetic.

20. A method as defined in claim 19, wherein said fat mimetic includes a mimetic selected from the group consisting of rice starch, oat flour and mixtures thereof.

21. A method as defined in claim 3, wherein said mixtures includes lecithin.

22. A method as defined in claim 3, wherein said mixture includes maltodextrin.

23. A method as defined in claim 3, wherein said mixture includes a coloring compound.

24. A method as defined in claim 3, wherein said mixture includes an artificial sweetener.

25. A method of making a substantially fat free edible composition comprising the steps of:
   a) forming a mixture of crystalline sorbitol and water, said mixture comprising at least about two and a half times the weight of sorbitol compared to said water;
   b) heating said mixture to a temperature of less than about 120° F.; and,
   c) cooling said mixture.

26. A method as defined in claim 25, wherein said mixture comprises about 25–50% crystalline sorbitol.

27. A method as defined in claim 26, wherein said mixture comprises at least about five times the weight of sorbitol to said water.

28. A method as defined in claim 25, wherein said mixture is heated to about 80° F. to about 110° F.

29. A method as defined in claim 25, wherein said heated mixture is cooled to a temperature of less than about 70° F.

30. A method as defined in claim 25, including the additional steps of:
   d) applying said heated mixture to a food product; and,
   e) cooling said food product to a temperature of less than about 70° F.

31. A method as defined in claim 25, wherein said water is less than about 10 weight percent.

32. A method as defined in claim 25, wherein said mixture includes a food flavor ingredient.

33. A method as defined in claim 32, wherein said food flavor ingredient includes an ingredient selected from the group consisting of fruit, chocolate, caramel, peanut butter, and mixtures thereof.

34. A method as defined in claim 32, wherein said mixture includes a food acid, said food acid includes an acid selected from the group consisting of malic acid, citric acid and mixtures thereof.

35. A method as defined in claim 25, wherein said mixture includes a plasticizer.

36. A method as defined in claim 35, wherein said plasticizer includes polyol.

37. A method as defined in claim 36, wherein said plasticizer includes glycerin.

38. A method as defined in claim 36, wherein said plasticizer includes maltitol.

39. A method as defined in claim 35, wherein said plasticizer is 10–25% by weight of said mixture.

40. A method as defined in claim 25, wherein said mixture has a water activity in the range of 0.35 to 0.60.

41. A method as defined in claim 25, wherein said mixture has a solids content of at least about 90%.

42. A method as defined in claim 25, wherein said mixture includes a bulking agent and has a solids content of at least about 90%.

43. A method as defined in claim 25, wherein said mixture being heated for up to about five minutes.

44. A method as defined in claim 25, including the additional step of only partially dissolving said crystalline sorbitol in said water.

45. A method as defined in claim 25, wherein said mixture includes a fat mimetic.

46. A method as defined in claim 45, wherein said fat mimetic includes mimetic selected from the group consisting of rice starch, oat flour and mixtures thereof.

47. A method as defined in claim 25, wherein said mixtures includes lecithin.

48. A method as defined in claim 25, wherein said mixture includes maltodextrin.

49. A method as defined in claim 25, wherein said mixture includes a coloring compound.

50. A method as defined in claim 25, wherein said mixture includes an artificial sweetener.

51. A method as defined in claim 25, wherein said mixture comprises (weight percent):

| | |
|---|---|
| sorbitol (crystals) | 25–50 |
| water | <10 |
| plasticizer | 0–30 |
| maltodextrin | 0–20 |
| fat mimetic | 0–5 |
| food additive/flavoring | 0–13 |
| lecithin | 0–2 |
| food acid | 0–2 |
| artificial sweetener | 0–1 |
| coloring compound | 0–1. |

52. A substantially fat free edible composition having essentially no added natural sugar and the physical temperature characteristics of a hydrogenated fat, said composition comprising at least about 10 weight percent plasticizer, about 25 to about 50 weight percent sorbitol crystals partially dissolved by heating in water to a temperature of less than about 120° F. for at least about two minutes, said water content up to about 10 weight percent.

53. An edible composition as defined in claim 52, wherein said sorbitol crystals and, water are heated to a temperature of about 80° F. to about 110° F.

54. An edible composition as defined in claim 53, wherein said time of heating is about two to about five minutes.

55. An edible composition as defined in claim 54, having a water activity of less than 0.60.

56. An edible composition as defined in claim 55, wherein said plasticizer includes a polyol.

57. An edible composition as defined in claim 52 having a water activity of less than 0.60.

58. An edible composition as defined in claim 52, wherein said plasticizer includes a polyol.

59. An edible composition as defined in claim 58, wherein said polyol is selected from the group consisting of glycerol, maltitol and mixtures thereof.

60. An edible composition as defined in claim 59, wherein said plasticizer is in the range of 10–25% by weight of the composition.

61. An edible composition as defined in claim 56, wherein said polyol is selected from the group consisting of glycerol, maltitol and mixtures thereof.

62. An edible composition as defined in claim 61, having a solid content of at least about 90% by weight.

63. An edible composition as defined in claim 62, including a non-crystallizing solid bulking agent.

64. An edible composition as defined in claim 63, including a dispersion of a food component for flavoring said composition.

65. An edible composition as defined in claim 64, wherein said food component includes a food selected from the group consisting of fruit, chocolate, caramel, peanut butter, and mixtures thereof.

66. An edible composition as defined in claim 65, wherein said food component includes fruit, said fruit includes up to about 10 weight percent of a fruit concentrate.

67. An edible composition as defined in claim 66, wherein said plasticizer is in the range of 10–25% by weight of the composition.

68. An edible composition as defined in claim 67, wherein said composition includes a fat mimetic.

69. An edible composition as defined in claim 68, wherein said fat mimetic includes a mimetic selected from this group consisting of rice starch, oat flour and mixtures thereof.

70. An edible composition as defined in claim 69, wherein said composition includes a food acid, said food acid includes an acid selected from the group consisting of malic acid, citric acid and mixtures thereof.

71. An edible composition as defined in claim 70, wherein said composition includes lecithin.

72. An edible composition as defined in claim 71, wherein said composition includes a coloring compound.

73. An edible composition as defined in claim 72, wherein said composition includes an artificial sweetener.

74. An edible composition as defined in claim 63, wherein said solid bulking agent includes a bulking agent selected from the group consisting of polyol, maltodextrin and mixtures thereof.

75. An edible composition as defined in claim 52, including a dispersion of a food component for flavoring said composition.

76. An edible composition as defined in claim 52, wherein said plasticizer is in the range of 10–25% by weight of the composition.

77. An edible composition as defined in claim 52, wherein said composition includes a fat mimetic.

78. An edible composition as defined in claim 77, wherein said fat mimetic includes a mimetic selected from this group consisting of rice starch, oat flour and mixtures thereof.

79. An edible composition as defined in claim 52, wherein said composition includes lecithin.

80. An edible composition as defined in claim 52, wherein said composition includes a coloring compound.

81. An edible composition as defined in claim 52, wherein said composition includes an artificial sweetener.

82. A substantially fat free edible composition having the physical temperature characteristics of a generally hydrogenated fat, said composition comprising:

| | |
|---|---|
| sorbitol (crystals) | 25–50% by weight |
| water | <10% by weight |
| plasticizer (non-[crystalling]crystalizing) | 0–25% by weight |
| food component | 0–10% by weight | said water added in at least an effective amount to at least dissolve said sorbitol.

83. An edible composition as defined in claim 82, wherein said plasticizer is in the range of 10–25% by weight of the composition.

84. An edible composition as defined in claim 82, wherein said plasticizer includes a polyol.

85. An edible composition as defined in claim 84, wherein said polyol is selected from the group consisting of glycerol, maltitol and mixtures thereof.

86. An edible composition as defined in claim 82, having solids of at least about 90% by weight of said composition.

87. An edible composition as defined in claim 82, having a water activity of less than about 0.60.

88. An edible composition as defined in claim 87, wherein said water activity is in the range of about 0.35–0.60.

89. An edible composition as defined in claim 82, including 0–3% by weight of lecithin.

90. An edible composition as defined in claim 82, including a non-crystallizing solid bulking agent.

91. An edible composition as defined in claim 90, wherein said solid bulking agent includes a bulking agent selected from the group consisting of polyol, maltodextrin and mixtures thereof.

92. An edible composition as defined in claim 82, wherein said food component includes a food selected from the group consisting of fruit, chocolate, caramel, peanut butter, and mixtures thereof.

93. An edible composition as defined in claim 82, wherein said composition includes a fat mimetic.

94. An edible composition as defined in claim 82, wherein said composition includes a food acid, said food acid includes an acid selected from the group consisting of malic acid, citric acid and mixtures thereof.

95. An edible composition as defined in claim 82, wherein said composition includes a coloring compound.

96. An edible composition as defined in claim 82, wherein said composition includes an artificial sweetener.

97. A laminated wafer product as defined in claim 96, wherein said edible composition has a solid content of at least about 90%.

98. A laminated wafer product as defined in claim 96, wherein said edible composition includes a non-crystallizing solid bulking agent.

99. A laminated wafer product having a layer of edible food based composition between two baked wafers, said composition being generally fat free with essentially no added natural sugar and having this physical temperature characteristics of a generally hydrogenated fat, said composition comprising sorbitol crystals partially dispersed by heat in water to obtain a water activity of less than about 0.60, and a food component, said sorbitol crystals constituting up to about 50 weight percent of said composition, said food component including a food selected from this group consisting of fruit, chocolate, caramel, peanut butter, and mixtures thereof.

100. A laminated wafer as defined in claim 99, wherein said food component includes fruit.

101. A laminated wafer as defined in claim 99, wherein said sorbitol crystals constitutes about 25 to about 50 weight percent of said composition.

102. A laminated wafer product as defined in claim 99, wherein said edible composition contains a plasticizer.

103. A laminated wafer product as defined in claim 102, wherein said plasticizer is in the range of 10–25% by weight of said edible composition.

104. A laminated wafer as defined in claim 102, wherein said plasticizer is selected from this group consisting of glycerin, maltitol and mixtures thereof.

* * * * *